(12) United States Patent
Perianu

(10) Patent No.: US 10,206,052 B2
(45) Date of Patent: Feb. 12, 2019

(54) ANALYTICAL DETERMINATION OF REMOTE BATTERY TEMPERATURE THROUGH DISTRIBUTED SENSOR ARRAY SYSTEM AND METHOD

(71) Applicant: BRAGI GmbH, München (DE)

(72) Inventor: Vlad Perianu, München (DE)

( * ) Notice: Subject to any disclaimer, the term of this patent is extended or adjusted under 35 U.S.C. 154(b) by 3 days.

(21) Appl. No.: 15/387,902

(22) Filed: Dec. 22, 2016

(65) Prior Publication Data

US 2017/0180897 A1     Jun. 22, 2017

Related U.S. Application Data

(60) Provisional application No. 62/270,675, filed on Dec. 22, 2015.

(51) Int. Cl.
| | | |
|---|---|---|
| *H04R 1/10* | (2006.01) | |
| *H04R 29/00* | (2006.01) | |
| *H02J 7/00* | (2006.01) | |

(52) U.S. Cl.
CPC ......... *H04R 29/001* (2013.01); *H04R 1/1016* (2013.01); *H04R 1/1025* (2013.01); *H02J 2007/005* (2013.01); *H04R 2460/03* (2013.01)

(58) Field of Classification Search
CPC .. H04R 29/001; H04R 1/1016; H04R 1/1025; H04R 2460/03
USPC ......... 381/58, 74, 374, 380, 151; 455/67.11, 455/226.1; 713/186, 766, 765, 763; 73/766, 765, 763, 186
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |

(Continued)

FOREIGN PATENT DOCUMENTS

| | | |
|---|---|---|
| EP | 1017252 A2 | 7/2000 |
| EP | 2903186 A1 | 8/2015 |

(Continued)

OTHER PUBLICATIONS

Announcing the $3,333,333 Stretch Goal (Feb. 24, 2014).

(Continued)

*Primary Examiner* — Vivian Chin
*Assistant Examiner* — Con P Tran
(74) *Attorney, Agent, or Firm* — Goodhue, Coleman & Owens, P.C.

(57) ABSTRACT

A system, method and wireless earpieces for determining a status of the wireless earpiece. Sensor measurements are made utilizing sensors of the wireless earpieces at a first location. The sensor measurements are analyzed. Data is extrapolated for one or more other locations utilizing the sensor measurements from the first location within the wireless earpiece.

20 Claims, 4 Drawing Sheets

(56) References Cited

U.S. PATENT DOCUMENTS

| | | |
|---|---|---|
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0254780 A1 | 10/2008 | Kuhl et al. |
| 2009/0017881 A1 | 1/2009 | Madrigal |
| 2009/0154739 A1* | 6/2009 | Zellner ............... H04R 1/1041 381/311 |
| 2010/0113894 A1* | 5/2010 | Padiy .................. A61B 5/0002 600/301 |
| 2010/0320961 A1 | 12/2010 | Castillo et al. |
| 2011/0286615 A1 | 11/2011 | Olodort et al. |
| 2014/0269811 A1* | 9/2014 | Maleki ............... H01M 10/486 374/1 |
| 2014/0270227 A1 | 9/2014 | Swanson |

FOREIGN PATENT DOCUMENTS

| | | |
|---|---|---|
| GB | 2074817 | 4/1981 |
| WO | 2014043179 A2 | 3/2014 |
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).

(56) References Cited

OTHER PUBLICATIONS

BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before The Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

\* cited by examiner

ANALYTICAL DETERMINATION OF REMOTE BATTERY TEMPERATURE THROUGH DISTRIBUTED SENSOR ARRAY SYSTEM AND METHOD

PRIORITY STATEMENT

This application claims priority to U.S. Provisional Patent Application 62/270,675, filed on Dec. 22, 2015, and entitled Analytical Determination of Remote Battery Temperature Through Distributed Sensor Array System and Method, hereby incorporated by reference in its entirety.

BACKGROUND

I. Field of the Disclosure

The illustrative embodiments relate to wireless earpieces. More specifically, but not exclusively, the illustrative embodiments relate to determining the status of a wireless earpiece including battery temperature utilizing a distributed sensor array of the wireless earpiece.

II. Description of the Art

The growth of wearable devices is increasing exponentially. This growth is fostered by the decreasing size of microprocessors, circuit boards, chips, and other components. Even with the advancements, the footprint available for the wearable devices may be very limited. As a result, designing and manufacturing the wearable device with sufficient sensors and other components to enhance operation may be challenging.

SUMMARY OF THE DISCLOSURE

One embodiment provides a system, method and wireless earpieces for determining a status of the wireless earpiece. Sensor measurements are made utilizing sensors of the wireless earpieces at a first location. The sensor measurements are analyzed. Data is extrapolated for one or more other locations utilizing the sensor measurements from the first location within the wireless earpiece. Another embodiment provides wireless earpieces including a processor and a memory storing a set of instructions. The set of instructions are executed to perform the method described.

Another embodiment provides a wireless earpiece. The wireless earpiece includes a frame for fitting in an ear of a user. The wireless earpiece also includes a logic engine controlling functionality of the wireless earpiece. The wireless earpiece also includes a number of sensors generating sensor measurements at a first location. The logic engine analyzes the sensor measurements received from the plurality of sensors, and extrapolates data for one or more other locations utilizing the sensor measurements from the first location within the wireless earpiece.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

The illustrative embodiments provide a system, method, and a wireless earpiece for determining a status of the wireless earpiece utilizing sensors within the wireless earpiece. Although the wireless earpieces may be utilized as a pair, each of the individual wireless earpieces may determine its status to maintain maximum functionality and efficiency. The description included herein may refer to the wireless earpieces individual or collectively. The status may refer to the entire wireless earpiece system or individual components within the wireless earpiece as well.

The wireless earpieces of the illustrative embodiments are configured to lit at least partially into an external auditory canal of the user. As a result, the space available for sensors and other components is limited. For example, there may be insufficient sensors to measure temperature in a number of different positions corresponding to the components or subsystems of the wireless earpieces. The illustrative embodiments provide a system and method whereby the wireless earpiece may utilize sensor measurements of conditions at a first location to extrapolate the conditions at a one or more remote location within the wireless earpiece. The wireless earpiece may utilize historical data, distances between locations or positions, density of the wireless earpiece, conduction, separating materials, and other factors to extrapolate data from the sensor measurements. The illustrative embodiments may also extrapolate user conditions and data by extrapolating based on the sensor measurements. In one embodiment, the sensors of the wireless earpieces may include a distributed sensor array that may perform the sensor measurements herein described.

Figure 1:
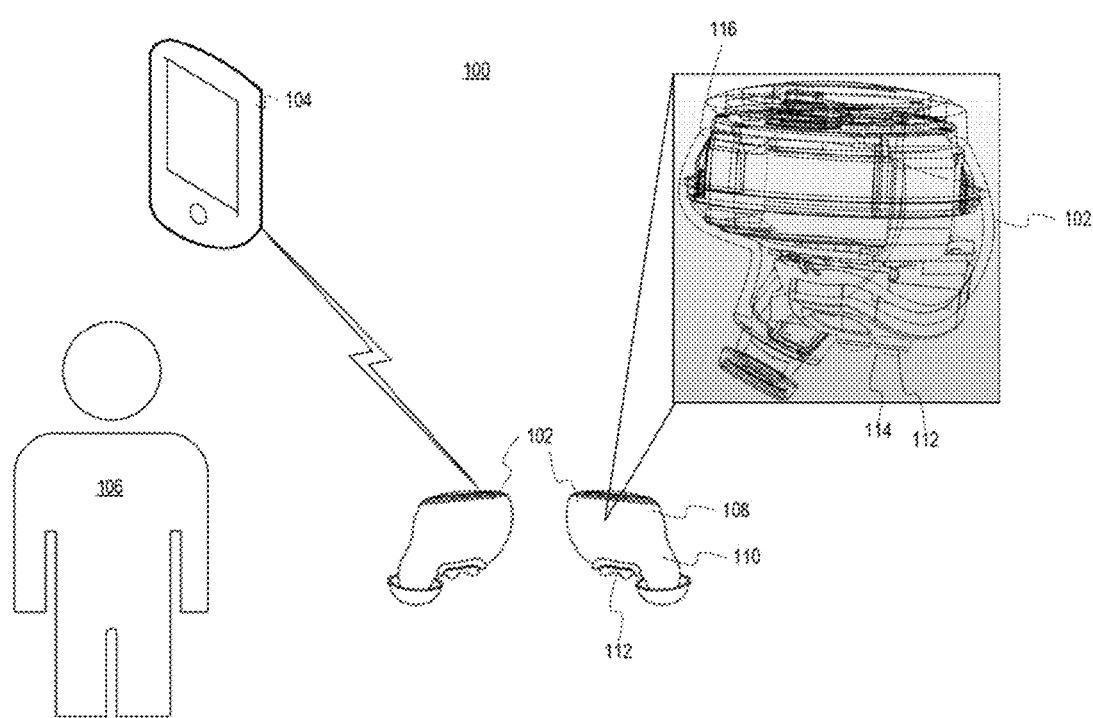
FIG. 1 is a pictorial representation of a communication system in accordance with an illustrative embodiment.

FIG. 1 is a pictorial representation of a wireless environment 100 in accordance with an illustrative embodiment. The wireless earpieces 102 may be configured to communicate with each other and with one or more wireless devices, such as a wireless device 104. The wireless earpieces 102 may be worn by a user 106 and are shown separately from their positioning within the ears of the user 106 for purposes of visualization. A block diagram of the wireless earpieces 102 if further shown in FIG. 2 to further illustrate components and operation of the wireless earpieces 102.

In one embodiment, the wireless earpieces 102 include a frame 108 shaped to fit substantially within the ears of the user 106. The frame 108 is a support structure that at least partially encloses and houses the electronic components of the wireless earpieces 102. The frame 108 defines an extension 110 configured to fit substantially within the inside of the ear of the user 106. The extension 110 may be removable covered by one or more sleeves. The sleeves may come in various sizes and have extremely tight tolerances to fit the user 106 and one or more other users that may utilize the wireless earpieces 102 during their expected lifecycle. In another embodiment, the sleeves may be custom built to support the interference fit utilized by the wireless earpieces 102 while also being comfortable while worn. In one embodiment, the frame 108 or the extension 110 may include sensors 112 for sensing pulse, blood oxygenation, temperature, glucose levels, and any number of internal or external user biometrics. In other embodiments, the sensors 112 may be internally positioned within the wireless earpieces 102. For example, the sensors 112 may represent metallic contacts, optical interfaces, or micro-delivery systems for receiving and delivering information. Small electrical charges may be passed through the sensors 112 to analyze the biometrics of the user 106 including pulse, blood analysis, sweat levels, band so forth.

In some applications, temporary adhesives or securing mechanisms (e.g., clamps, straps, extenders, etc.) may be utilized to ensure that the wireless earpieces 102 remain in the ears of the user 106 even during the most rigorous and physical activities. For example, the wireless earpieces 102 may be utilized during marathons, swimming, team sports, biking, hiking, parachuting, or so forth. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions.

The wireless earpieces 102 may determine their position with respect to each other as well as the wireless device 104. For example, position information for the wireless earpieces 102 and the wireless device 104 may determine proximity of the devices in the wireless environment 100. For example, global positioning information or signal strength/activity may be utilized to determine proximity and distance of the devices to each other in the wireless environment 100.

In one embodiment, the wireless earpieces 102 and the corresponding sensors 112 (whether internal or external) may be configured to take a number of measurements or log information during normal usage. The sensor measurements may be utilized to extrapolate other measurements, factors, or conditions applicable to the wireless earpieces 102. The user 106 may configure the wireless earpieces directly or through a connected device and app (e.g., mobile app with a graphical user interface) to store or share information, audio, images, and other data. Some examples of standard usage may include detecting and recording a heartbeat, active participation in a conversation, listening to music, or so forth.

In one embodiment, the wireless earpieces 102 may learn to extrapolate information based on historical information or secondary verification. For example, the user 106 may utilize a user interface presented by the wireless device 104 to measure lamination, such as the user's temperature, pulse rate, blood oxygenation, glucose levels, or so forth so that the wireless earpieces 102 may be adjusted or biased for the secondary measurements. As a result, the wireless earpieces 102 may be adjusted or trained over time to become even more accurate. The wireless earpieces 102 may utilize historical information to generate thresholds, policies, or settings for determining when and how data is extrapolated by the wireless earpieces 102 and how that data may be shared with the user 106 or the wireless device 104.

In one embodiment, the sensors 112 may be located at a position A 114. Sensor measurements may also be needed for a position B 116, however, due to the size and layout of the wireless earpieces 102, position B 116 may not include sensors. As a result, the logic of the wireless earpieces 102 may utilize the sensor measurements taken at position A 114 to extrapolate the corresponding data or conditions at position B 116.

In one example, the temperature measured at position A 114 by the sensors 112 may be utilized to determine the temperature at position B 116 which may be adjacent the battery of the wireless earpiece. The data may be extrapolated utilizing the distance between position A 114 and position B 116, thermal permeability between the positions as measured during manufacturing or based on historical data, and other factors that may affect the thermodynamics within the wireless earpieces 102. As a result, the battery temperature data may be extrapolated to ensure that the battery remains within normal parameters. In some instances, the measurements recorded, displayed, or communicated about position A 114 and position B 116 may be further adjusted based on the effect each position may have from various factors, such as positioning, adjacent components, conduction, cooling, movement, fluids or gasses in the environment, and so forth.

In another embodiment, the sensors 112 may instead be located at position B 116 and the data for Position A 114 may be extrapolated utilizing the sensor measurements from Position B 116. For example, the temperature measurements made by the sensors 112 at position B 116 may be utilized to determine the temperature at Position A 114. In the illustrative embodiments, position A 114 and position B 116 may represent any number of positions or locations on or within the wireless earpieces 102. However, Position A and Position B may also represent positions or locations on either of the wireless earpieces 102, the user 106, the wireless device 104, or other portions of the wireless environment 100.

In one embodiment, the wireless environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user 106.

The wireless earpieces 102 may include any number of sensors 112 and logic for measuring and determining user biometrics, such as pulse rate, blood oxygenation, temperature, calories expended, voice and audio output, position, and orientation (e.g., body, head, etc.). The sensors 112 may also determine the user's location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, finger swipes, motions or gestures, or other user inputs sensed by the wireless earpieces. The user input may be determined by the wireless earpieces 102 and converted into commands that may be sent to one or more external devices, such as the wireless device 104, a tablet computer, or so forth.

In other embodiments, the wireless environment 100 may include any number of devices, components, or so forth that may communicate with each other directly or indirectly through a wireless (or wired) connection, signal, or link. The wireless environment 100 may include one or more networks and network components and devices (not shown), such as routers, servers, signal extenders, intelligent network devices, computing devices, or so forth. In one embodiment, the network of the wireless environment 100 represents a personal area network as previously disclosed.

Communications within the wireless environment 100 may occur through the network or may occur directly between devices, such as the wireless earpieces 102 and the wireless device 104, or indirectly through a network, such as a Wi-Fi network. In one embodiment, the wireless environment 100 may communicate with or include a wireless network, such as a cellular (e.g., 3G, 4G, 5G, PCS, GSM, etc.), Bluetooth, or other short range or long range radio frequency network. The wireless environment 100 may also communicate with any number of hard wired networks, such as local area networks, coaxial networks, fiber-optic networks, network adapters, or so forth. Communications within the wireless environment 100 may be operated by one or more users, service providers, or network providers.

The wireless earpieces 102 may play, communicate, or utilize any number of alerts or communications to indicate that the status of the wireless earpieces 102. In one embodiment, the status information may be determined utilizing measurements made by the sensors 112 as well as data extrapolated from the sensor measurements. For example, an alert may be played audibly to the user 106 indicating "the battery is overheating and the device will shut down" based on the extrapolated data that is applicable to one or more of the batteries of the wireless earpieces 102. The wireless earpieces 102 may also play an alert indicating that the wireless earpieces are internally wet, have been impacted, are in contact with dangerous radiation, gasses, or compounds, or have experienced another event that may affect performance of the wireless earpieces 102. The corresponding action taken by the wireless earpieces 102 to correct the status or measurements may also be communicated to the user 106.

In other embodiments, the wireless earpieces 102 may also vibrate, flash, play a tone or other sound, or give other indications to the user 106 that the wireless earpieces 102 are in distress, taking correct actions, performing corrective actions, and/or experiencing a partial or complete failure. The wireless earpieces 102 may also communicate an alert to the wireless device 104 that shows up as a notification, message, or other indicator indicating the changed status of the wireless earpieces 102 and well as the sensed and extrapolated sensor measurements.

The wireless earpieces 102 as well as the wireless device 104 may include logic for automatically implementing corrective actions in response to various conditions and factors of the wireless environment 100. For example, the wireless device 104 may communicate instructions received from the wireless earpieces 102 for the user to address an error, problem, or issue being experienced by the wireless earpieces 102. The wireless device 104 may include an application that displays instructions and information to the user 106 in response to a simplified error code or message received from the wireless earpieces 102 which may be all that is possible during various events.

In one embodiment, the wireless device 104 may short-range or long-range wireless communications to communicate with the wireless earpieces 102 through a wireless signal or devices of the wireless environment 100. For example, the wireless device 104 may include a Bluetooth and cellular transceiver within the embedded logical components. For example, the wireless signal may be a Bluetooth, Wi-Fi, Zigbee, Ant+, or other short range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sharing data sent from the wireless earpieces 102. For example, the wireless device 104 may represent any number of android, iOS, Windows, open platforms, or other systems and devices. Similarly, the wireless device 104 or the wireless earpieces 102 may execute any number of applications that utilize the user input, proximity data, biometric data, and other feedback from the wireless earpieces 102 to tune, adjust, or bias sensor measurements, share applicable information and data, control the applications, play audible or tactile alerts, or make other selections.

As noted, the layout of the internal components of the wireless earpieces 102 and the limited space available for a product of limited size may affect where the sensors 112 may be positioned. The positions of the sensors 112 within each of the wireless earpieces 102 may vary based on the model, version, and iteration of the wireless earpiece design and manufacturing process. As a result, extrapolated data may be utilized to ensure proper operation and functionality of the wireless earpieces 102 are maintained.

Figure 2:
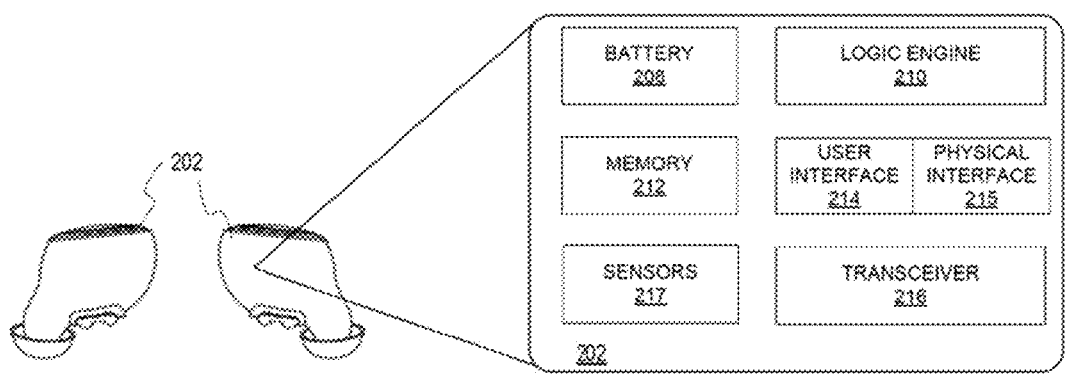
FIG. 2 is a block diagram of wireless earpieces in accordance with an illustrative embodiment.

FIG. 2 further illustrates a block diagram of the wireless earpieces 202. As noted, the components of the wireless earpieces 202 may be described collectively rather than individually. The wireless earpieces 202 may be wirelessly linked to any number of wireless devices, such as the wireless device 104 of FIG. 1. For example, wireless devices may include wearable devices, communications devices, computers, entertainment devices, vehicle systems, exercise equipment or so forth. Sensor measurements, user input, and commands may be received from either the wireless earpieces 202 or the wireless device (not shown) for processing and implementation on either of the devices (or other externally connected devices). Reference to the wireless earpieces 202 may descriptively or functionally refer to either the pair of wireless earpieces (wireless earpieces) or individual wireless earpieces (left wireless earpiece and right wireless earpiece) without limitation.

In some embodiments, the wireless device may act as a logging tool for sensor data or measurements made by the wireless earpieces 202. For example, the wireless device may share data captured by the wireless earpieces 202 in real-time. As a result, the wireless device may be utilized to store, display, and synchronize sensor data received from the wireless earpieces 202. For example, the wireless device may display user pulse rate, temperature, proximity, location, blood oxygenation, distance, calories burned, and so forth as measured by the wireless earpieces 202. The wireless device may be configured to receive and display alerts that indicate conditions to share sensor data have been met. For example, if the wireless earpieces 202 meet a distance threshold with a wireless device, the wireless earpieces 202 may automatically share pre-selected sensor data to the wireless device for display as an alert, message, or in-app communication. The wireless earpieces 202 and the wireless device may have any number of electrical configurations, shapes, and colors and may include various circuitry, connections, and other components.

In one embodiment, the wireless earpieces 202 may include a battery 208, a logic engine 210, a memory 212, a user interface 214, a physical interface 215, a transceiver 216, and sensors 217. The wireless device may have any number of configurations and include components and features as are known in the art.

The battery 208 is a power storage device configured to power the wireless earpieces 202. In other embodiments, the battery 208 may represent a fuel cell, thermal electric generator, piezo electric charger, solar charger, ultra-capacitor, or other existing or developing power storage technologies. The illustrative embodiments may protect the battery by either directly or indirectly determining the temperature of the batter 208 and determining whether it is operating within a normal range, tolerances, thresholds, or so forth. In one embodiment, the sensors 217 may include a thermal sensor that measures the user's temperature. The thermal sensor may also extrapolate the temperature of the batter 208 based on the measurements made remotely by the sensors 217. In another embodiment, the sensors 217 may include one or more thermal sensors positioned adjacent the battery 208. The thermal sensors may extrapolate the user's temperature based on the measurements made near the battery 208 by the sensors 217. The wireless earpieces 202 may utilize the sensors 217 to similarly extrapolate data at any number of locations within the wireless earpieces 202. The sensors 217 may also be utilized to extrapolate data about external conditions and factors applicable to the user, the user's environment, a communicating wireless device, or so forth. Other conditions and factors sensed by the sensors 217 (e.g., water/humidity, pressure, altitude, position, impact, radiation, etc.) may also be extrapolated with the data being processed by the logic engine 210.

The logic engine 210 is the logic that controls the operation and functionality of the wireless earpieces 202. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize sensor measurements, user input, user preferences and settings, conditions, factors, and environmental conditions to extrapolate data from measurements performed by the wireless earpieces 202. The wireless earpieces 202 may function separately or together to extrapolate data for each the wireless earpieces 202 or externally connected devices. For example, processing may be divided between the wireless earpieces 202 when used as a set to increase the speed of processing and to load balance any processes being performed.

In one embodiment, the logic engine 210 may perform the data extrapolation based on measurements and data from the sensors 217. The logic engine 210 may perform any number of mathematical functions (e.g. linear extrapolation, polynomial extrapolation, conic extrapolation, French curve extrapolation, polynomial interpretation) to infer data from the existing sensor measurements from one or more sensors 217. The logic engine 210 may utilize time and other sensor measurements as causal forces to enhance a function utilized to perform the extrapolation by the logic engine 210.

The logic engine 210 may also process user input to determine commands implemented by the wireless earpieces 202 or sent to the wireless earpieces 202 through the transceiver 216. Specific corrective actions may be associated with sensor measurements, extrapolated measurements, environmental conditions, proximity thresholds, and so forth. For example, the logic engine 210 may implement a macro allowing the user to share data when the wireless earpieces are proximate the wireless device 204.

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 212 is a hardware element, device, or recording media configured to store data or instructions for subsequent retrieval or access at a later time. The memory 212 may represent static or dynamic memory. The memory 212 may include a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the status of a user, wireless earpieces 202, wireless device 204, and other peripherals, such as a wireless device, smart glasses, smart watch, smart case for the wireless earpieces 202, wearable device, and so forth. In one embodiment, the memory 212 may display or communicate instructions, programs, drivers, or an operating system for controlling the user interface 214 including one or more LEDs or other light emitting components, speakers, tactile generators (e.g., vibrator), and so forth. The memory 212 may also store sensor measurements, an extrapolation processes, extrapolation data, bias levels, thresholds, conditions, signal or processing activity, historical information, proximity data, and so forth.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 216 may also be a hybrid transceiver that supports a number of different communications. For example, the transceiver 216 may communicate with wireless devices or other systems utilizing wired interfaces (e.g., wires, traces, etc.), NFC or Bluetooth communications. The transceiver 216 may also detect amplitudes and infer distance between the wireless earpieces 202 and external devices, such as the wireless device or a smart case of the wireless earpieces 202.

The components of the wireless earpieces 202 may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with wireless devices or other electrical components, devices, or systems.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of a wireless device. In another embodiment, the physical interface 215 may include a wireless inductor for charging the wireless earpieces 202 without a physical connection to a charging device.

The user interface 214 is a hardware interface for receiving commands, instructions, or input through the touch (haptics) of the user, voice commands, or predefined motions. For example, the user interface 214 may include a touch screen, one or more cameras or image sensors, microphones, and so forth. The user interface 214 may be utilized to control the other functions of the wireless earpieces 202. The user interface 214 may include the LED array, one or more touch sensitive buttons or portions, a miniature screen or display, or other input/output components. The user interface 214 may be controlled by the user or based on commands received from the wireless device or a linked wireless device. For example, the user may turn on, reactivate, or provide feedback utilizing the user interface 214.

In one embodiment, the user may provide feedback by tapping, the user interface 214 once, twice, three times, or any number of times. Similarly, a swiping motion may be utilized across or in front of the user interface 214 (e.g., the exterior surface of the wireless earpieces 202) to implement a predefined action. Swiping motions in any number of directions or gestures may be associated with specific activities, such as share exercise data, share music playlist, share vitals, play music, pause, fast forward, rewind, activate a digital assistant (e.g., Siri, Cortana, smart assistant, etc.), or so forth without limitation. The swiping motions may also be utilized to control actions and functionality of wireless devices or other external devices (e.g., smart television, camera array, smart watch, etc.). The user may also provide user input by moving his head in a particular direction or motion or based on the user's position or location. For example, the user may utilize voice commands, head gestures, or touch commands to change the content displayed by a wireless device. The user interface 214 may also provide a software interface including any number of icons, soft buttons, windows, links, graphical display elements, and so forth.

The sensors 217 may include pulse oximeters, accelerometers, gyroscopes, magnetometers, water, moisture, or humidity detectors, impact/force detectors, thermometers, inertial sensors, photo detectors, miniature cameras, and other similar instruments for detecting location, utilization, orientation, motion, and so forth. The sensors 217 may also be utilized to determine the biometric, activity, location, and speed measurements of the user. In one embodiment, the sensors 217 may store data that may be shared with other components (e.g., logic engine 210 performing extrapolation for a remote location), users, and devices.

Externally connected wireless devices may include components similar in structure and functionality to those shown for the wireless earpieces 202. For example, a wireless device may include any number of processors, batteries, memories, busses, motherboards, chips, transceivers, peripherals, sensors, displays, cards, ports, adapters, interconnects, and so forth. In one embodiment, the wireless device may include one or more processors and memories for storing instructions. The instructions may be executed as part of an operating system, application, browser, or so forth to implement the features herein described. For example, the user may set sensor extrapolation preferences for the wireless earpieces 202 utilizing a wireless device. In one embodiment, the wireless earpieces 202 may be magnetically or physically coupled to the wireless device to be recharged or synchronized or to be stored.

The wireless device may also execute an application with settings or conditions for updating, synchronizing, saving, and utilizing sensor sharing and extrapolation settings. The user may adjust and program the settings including specified users, thresholds, activities, conditions, environmental factors, and so forth.

In another embodiment, the wireless device may also include sensors for detecting the location, orientation, and proximity of the wireless earpieces 202 to the wireless device. The wireless earpieces 202 may turn off sharing to the wireless device in response to losing a status or heart beat connection to preserve battery life and may only periodically search for a connection, link, or signal to the wireless device.

As originally packaged, the wireless earpieces 202 and the wireless device may include peripheral devices such as charging cords, power adapters, inductive charging adapters, solar cells, batteries, lanyards, additional light arrays, speakers, smart case covers, transceivers (e.g., Wi-Fi, cellular, etc.), or so forth. In one embodiment, the wireless earpieces 202 may include a smart case (not shown). The saran case may include an interface for charging the wireless earpieces 202 from an internal battery or through a wall connection to the smart case. The smart case may also utilize the interface or a wireless transceiver to log utilization, biometric information of the user, and other information and data. The smart case may also be utilized to perform the sensor extrapolation and calibration features, operations, and methods herein described.

The illustrative embodiments provide a system, method and devices for processing sensor measurements and data retrieved by the sensors 217 for extrapolation. The sensor data may be utilized to extrapolation data, conditions, parameters, or other factors for other portions of the wireless earpieces 202. The sensors 217 may include temperature sensors, humidity and water sensors, impact sensors, radiation detectors, pulse oximeters, accelerometers, gyroscopes, altitude sensors, GPS chips, and so forth. The sensors 217 may also be utilized to sense any number of biometric readings or information, such as heart rate, respiratory rate, blood, or skin physiology, or other biometric data.

The sensors 217 may be stand-alone measurement devices or may be integrated in one or more chips, motherboards, cards, circuits, or so forth. The wireless earpieces 202 may communicate with other wearables (e.g., smart watch, ring, jewelry, smart wearables, etc.) to modify, filter, or otherwise optimize the accuracy of the sensor measurements.

In one embodiment, one of the sensors 217 experiencing a high level of noise or distortion may be ignored or disregarded while utilizing the measurements from a different sensor. For example, one of the sensors 217 that may have failed may be ignored in response to improper or unreliable data being gathered. As a result, the extrapolation process may be dynamically performed utilizing an combination of sensor measurements. For example, the number and position of the sensors 217 utilized to perform extrapolation for different positions of the wireless earpieces 202 may vary based on failures, inaccurate data, or other temporary or permanent issues with hardware and software of the wireless earpieces 202.

Figure 3:
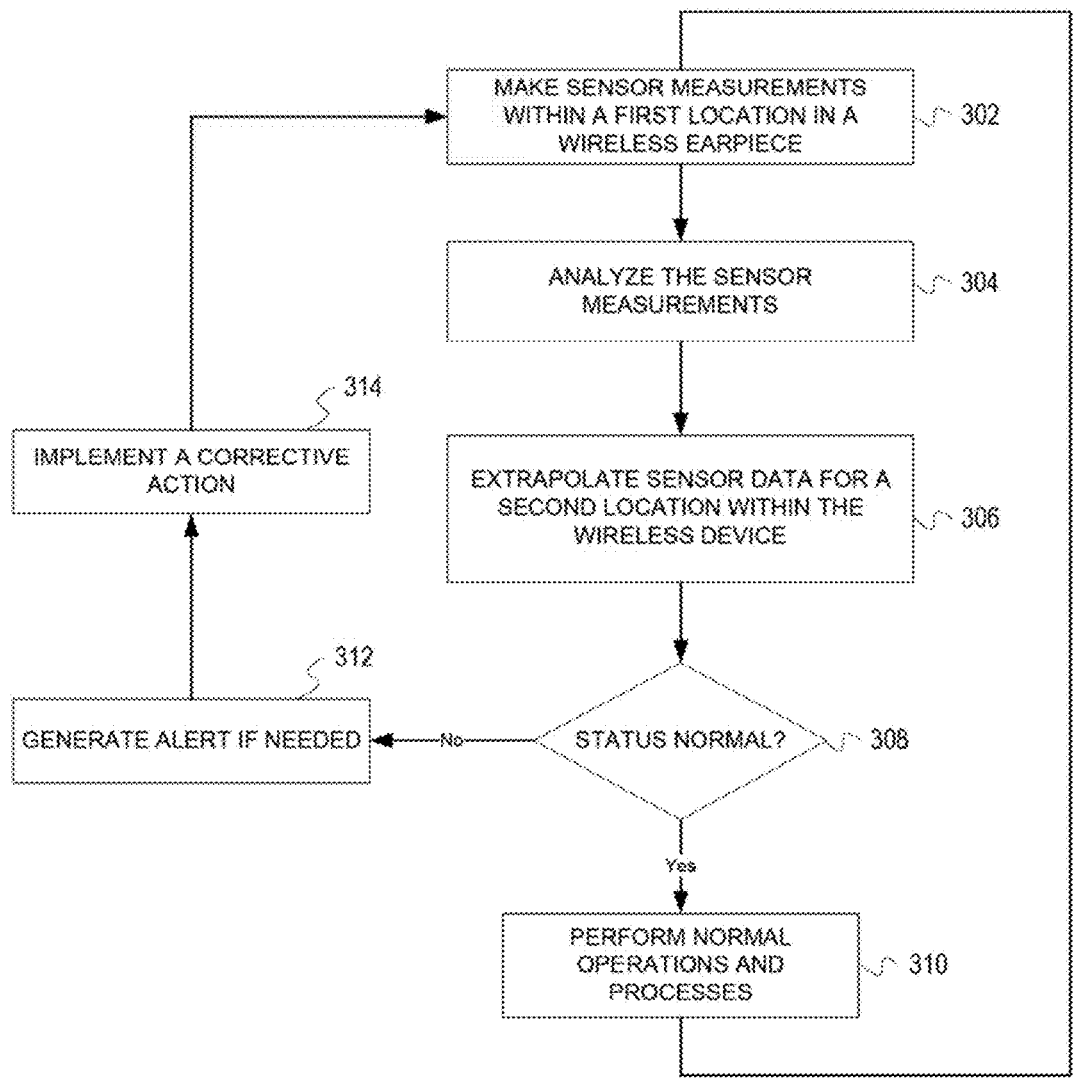
FIG. 3 is a flowchart of a process for determining a scams of a wireless earpiece in accordance with an illustrative embodiment.

FIG. 3 is a flowchart of a process for determining, a status of a wireless earpiece in accordance with an illustrative embodiment. In one embodiment, the process of FIG. 3 may be implemented by one or more wireless earpieces, such as the wireless earpieces 104 of FIG. 1. For example, the method of FIG. 3 may be performed for each wireless earpiece to determine the internal status of each of the wireless earpieces. In one embodiment, the system status may include temperature, humidity, moisture, or water status, radiation, environmental compounds (e.g., gasses, mixtures, etc.) shock, and so forth. The method of FIG. 3 may be performed to determine whether the wireless earpiece is operating within normal parameters. In particular, the existing sensors of the wireless earpiece may be utilized to extrapolate other data applicable to different points and components of the wireless earpiece.

The process may begin with the wireless earpiece making sensor measurements within a first location in a wireless earpiece (step 302). The sensor locations for the wireless earpieces may vary. In one example, the sensor may be a temperature sensor positioned adjacent an exterior surface of the wireless earpiece for sensing the temperature of the user. The changes in temperatures sensed by the temperature sensor at the first location may relate to the temperature at the battery of the wireless earpiece as is subsequently described.

Next, the wireless earpiece, analyzes the sensor measurements (step 304). The sensor measurements may be analyzed for accuracy statistical significance, and so forth. The wireless earpieces may also perform biasing or error correction as needed during step 304. For example, measurements from a damaged or Wing sensor may be disregarded during the analysis of step 304. The sensor measurements may be run through any number of computations utilizing the processor of the wireless earpiece.

Next, the wireless earpiece extrapolates datas for a second location within the wireless device (step 306). In one embodiment, the wireless earpiece may utilize a table or historical data and information to ascertain or extrapolate the temperature data of the second location utilizing the sensor measurements from the first location. The wireless earpiece may also utilize a secondary device, such as wireless thermometers, cell phones, or other devices that may make measurements of the user to determine the accuracy of the sensor measurements made during step 302 and how those measurements at the first location may affect the data extrapolated for the second location. During step 306, the wireless earpiece may also revise the sensors measurements that are recorded or communicated by the wireless earpiece. For example, the wireless earpiece may make temperature measurements for the user at a specified sample time that are updated or revised based on the secondary factors determined during step 306 before being stored for communication to the user.

Next, the wireless earpiece determines whether the status is normal (step 308). The status may be determined based on normal operating parameters for the wireless earpieces. For example, the wireless earpiece may define normal operating temperatures, sudden impacts, accelerations, or shocks (e.g., measured in Newtons), humidity or water measurements, and so forth.

If the status of the wireless earpiece is determined to be normal during step 308, the wireless earpiece performs normal operations and processes (steps 310). During step 310, the wireless earpiece may operate in the normal or default operating mode. The sensor measurements extrapolated during step 306 may be utilized to determine whether the wireless earpiece is operating normally and is free from dam age, danger (e.g., overheating, water seepage, shock damage, etc.).

If the status of the wireless earpiece is determined to not be normal during step 308, the wireless earpiece generates an alert if needed (step 312). The alert may be generated in any number of ways. In one embodiment, the alert is an internal alert that may be sent internally within the wireless earpiece, such as from the sensors to the logic of the wireless earpiece in order to process the extrapolated sensor data. In another embodiment, the alert is communicated to the user as an audio, tactile, or visual alert. The alert may also be communicated to a wireless device in communication with the wireless earpiece. For example, an alert may be sent to a cell phone in communication with the wireless earpiece to display an application specific alert to the user, such as "Your Wireless earpiece is overheating."

Next, the wireless earpiece implements a correct action (step 314). The corrective action may compensate for, fix, troubleshoot, or minimize the effects of the extrapolated sensor data. For example, in response to detecting moisture within the wireless earpiece may shut itself down to dry until such time as water sensors determine that the wireless earpiece is dry and will not be damaged by operating. In another example, the wireless earpiece may implement cooling techniques in response to determining the battery is overheating. The cooling techniques may include shutting down components and processes, requesting removal from the user's ear, and advising the user to decrease the environment temperature if possible (e.g., left on the dash of a automobile) or take other actions. The wireless earpiece may then return again to step 302 to make sensor measurements. As a result, the wireless earpiece may constantly utilize sensor measurements to extrapolate operational parameters, conditions, and other information and data that may be utilized to troubleshoot, protect, adjust performance, or otherwise enhance the operation of the wireless earpiece for the user.

The process of FIG. 3 may allow the wireless earpieces to utilize logic to extrapolate data for other locations, components, users, and environments. As a result, the limited abilities of the sensors of the wireless earpieces are greatly expanded through extrapolation.

The illustrative embodiments provide a system, method, wireless earpiece(s) for extrapolating data generated by sensor of a wireless earpiece at a first location for one or more other locations. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer through the Internet using an Internet Service Provider).

Figure 4:
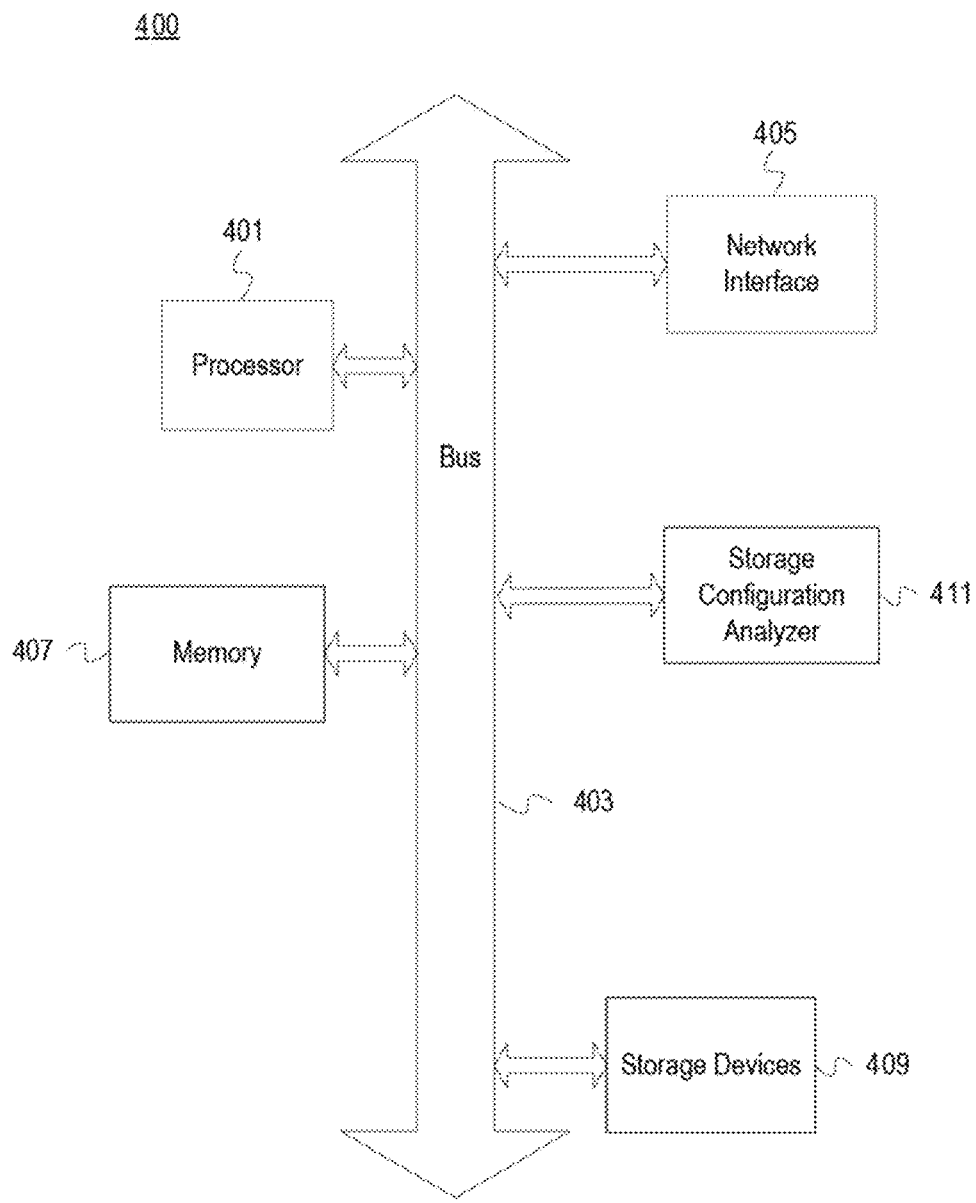
FIG. 4 depicts a computing system in accordance with an illustrative embodiment.

FIG. 4 depicts a computing system 400 in accordance with an illustrative embodiment. For example, the computing system 400 may represent a device, such as the wireless device 104 of FIG. 1. The computing device 400 may be utilized to receive user settings, instructions, or feedback for controlling the power management features of the wireless earpieces together and separately. The computing system 400 includes a processor unit 401 (possibly including multiple processors, multiple cores, multiple nodes, and/or implementing multi-threading, etc.). The computing system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 403 (e.g., PCI, ISA, PCI-Express, HyperTransport®, InfiniBand®, NuBus, etc.), network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate retrieval of the audio information associated with an identifier. Code may be implemented in any of the other devices of the computing system 400. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being, coupled to the bus 403, the memory 407 may be coupled to the processor unit 401.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. For example, although shown primarily in an ear bud configuration, the wireless earpiece(s) may have other form factors such as being apart of a head set, behind-the-ear (BTE) type configuration, or other type of wireless earpiece configurations. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for determining a status of a wireless earpiece, the method comprising:

making sensor measurements utilizing sensors of the wireless earpiece at a first location, wherein the sensor measurements indicate a temperature at the first location;

adjusting the sensor measurements based upon thermal properties of components adjacent to the first location including one or more of a memory, a transceiver, a circuit, and a logic engine, the adjustments to the sensor measurements are performed utilizing one or more of historical information and biasing information for enhanced accuracy;

analyzing the adjusted sensor measurements regarding at least temperature;

performing error correction of the adjusted sensor measurements utilizing one or more of historical information and bias levels;

determining whether the corrected sensor measurements are within one or more thresholds;

extrapolating data for one or more other locations away from the first location utilizing the corrected sensor measurements from the first location within the wireless earpiece by utilizing distances between the first location and the one or more other locations, wherein the data indicates a temperature of a battery of the wireless earpiece; and implementing a corrective action for the wireless earpieces in response to determining the corrected sensor measurements are outside the one or more thresholds, wherein the corrective action includes one or more of shutting down one or more of the components, performing self-repair or troubleshooting, performing a cooling process, and providing the user instructions, and wherein the adjusting, analyzing, performing, determining, extrapolating, and implementing are performed by the logic engine.

2. The method of claim 1, wherein the one or more thresholds indicate whether the wireless earpiece is operating within a normal status.

3. The method of claim 1, further comprising:
making the sensor measurements utilizing a plurality of sensors at a plurality of locations to extrapolate the data.

4. The method of claim 1, further comprising:
calibrating the sensors utilizing data from one or more externally connected electronic devices.

5. The method of claim 1, further comprising:
communicating an alert to a user of a wireless device.

6. The method of claim 5, wherein the alert is a tactile alert.

7. The method of claim 5, further comprising:
receiving an extrapolation preference set by the user of the wireless device.

8. The method of claim 7, further comprising:
using historical data to improve accuracy of the sensor measurements.

9. The method of claim 1, wherein the sensors are an array of sensors, and wherein the sensor measurements of a sensor that has failed or is experiencing errors are ignored for the extrapolating of the data.

10. A wireless earpiece comprising:
a processor for executing a set of instructions; and
a memory for storing the set of instructions, wherein the set of instructions are executed to:
make sensor measurements utilizing sensors of the wireless earpiece at a first location, wherein the sensors are an array of sensors and the sensor measurements indicate a temperature at the first location;
adjust the sensor measurements based upon thermal properties of components adjacent to the first location including one or more of a memory, a transceiver, a circuit, and a logic engine, the adjustments to the sensor measurements are performed utilizing one or more of historical in formation and biasing in formation for enhanced accuracy;
analyze the adjusted sensor measurements, wherein the sensor measurements of a sensor that has failed or is experiencing errors are ignored;
extrapolate data for one or more other locations away from the first location utilizing the adjusted sensor measurements from the first location within the wireless earpiece; wherein the data indicates a temperature of a battery of the wireless earpiece and the extrapolation of the data further utilizes one or more physical factors associated with the wireless earpiece;
determine whether the adjusted sensor measurements or extrapolated data are within one or more thresholds;
communicate an alert in response to determining the sensor measurements or extrapolated data are outside the one or more thresholds; and
implement a corrective action for the wireless earpieces in response to determining the adjusted sensor measurements or extrapolated data are outside the one or more thresholds, wherein the corrective action includes one or more of shutting down one or more of the components, performing self-repair or troubleshooting, performing a cooling process, and providing the user instructions.

11. The wireless earpiece of claim 10, wherein the extrapolation is performed utilizing one or more of historical information and bias levels.

12. The wireless earpiece of claim 10, wherein the one or more thresholds indicate whether the wireless earpiece is operating within a normal status.

13. The wireless earpiece of claim 10, wherein the extrapolating is performed utilizing distances between the first location and the one or more other locations.

14. The wireless earpiece of claim 10, wherein the set of instructions are further executed to:
calibrate the sensors utilizing data from one or more externally connected electronic devices.

15. The wireless earpiece of claim 10, wherein the extrapolated data is communicated to other components within the wireless earpiece.

16. The wireless earpiece of claim 10, wherein the set of instructions are further executed to:
use historical data to improve accuracy of the sensor measurements.

17. The wireless earpiece of claim 10, wherein the one or more physical factors includes at least one thermodynamic factor.

18. A wireless earpiece, comprising:
a frame for fitting in an ear of a user;
a logic engine controlling functionality of the wireless earpiece; and
a plurality of sensors generating sensor measurements at a first location,
wherein the logic engine adjusts the sensor measurements based upon components adjacent to the first location utilizing one or more of historical information and biasing information for enhanced accuracy, analyzes the adjusted sensor measurements received from the plurality of sensors, and extrapolates data for one or more other locations utilizing the adjusted sensor measurements from the first location within the wireless earpiece;
wherein the extrapolating is performed utilizing distances between the first location and the one or more other locations using at least a mathematical function;
wherein the logic engine determines whether the adjusted sensor measurements or extrapolated data are within one or more thresholds, and implements a corrective action for the wireless earpieces in response to determining the adjusted sensor measurements or extrapolated data are outside the one or more thresholds;
wherein the sensor measurements are one of temperature, moisture, and impact, and wherein the corrective action includes one or more of shutting down one or more of the components, performing self-repair or troubleshooting, performing a cooling process, and providing the user instructions.

19. The wireless earpiece of claim 18, wherein the logic engine utilizes additional sensor measurements to enhance the mathematical function.

20. The wireless earpiece of claim 18, wherein the corrective action comprises a macro allowing a user to share the sensor measurements with a wireless device.

* * * * *